United States Patent [19]

Levy

[11] Patent Number: 5,103,574

[45] Date of Patent: Apr. 14, 1992

[54] MEASURING TOOL FOR HANGING UP PICTURES AND THE LIKE

[76] Inventor: Karen K. Levy, 2567 Sherwood Rd., Bexley, Ohio 43209

[21] Appl. No.: 683,738

[22] Filed: Apr. 11, 1991

[51] Int. Cl.⁵ .............................................. G01B 3/10
[52] U.S. Cl. ........................................ 33/760; 33/613; 33/644; 33/769
[58] Field of Search ................ 33/613, 528, 644, 759, 33/760, 761, DIG. 10, 755, 769

[56] References Cited

U.S. PATENT DOCUMENTS

| | | | |
|---|---|---|---|
| 3,242,578 | 3/1966 | Moll | 33/761 X |
| 3,335,498 | 8/1967 | Barbee | 33/761 X |
| 4,648,185 | 3/1987 | Brandimarte | 33/669 |

FOREIGN PATENT DOCUMENTS 266920 5/1950 Switzerland .......................... 33/760

Primary Examiner—Harry N. Haroian
Attorney, Agent, or Firm—Richard L. Miller

[57] ABSTRACT

A measuring tool for hanging up a picture and the like onto a flat vertical surface, is provided and consists of a box-shaped housing. A mechanism is carried on the housing for ascertaining whether the housing is in a horizontal and vertical alignment with respect to the flat vertical service. Another mechanism is carried on the housing for taking linear measurements between two points on the flat vertical surface. A drawer having a pull handle is disposed in the housing for holding a plurality of nails therein. When the drawer is opened, two of the nails can be removed and hammered into the two points measured on the flat vertical surface, allowing the picture and the like to be properly hung up on the flat vertical surface.

2 Claims, 1 Drawing Sheet

MEASURING TOOL FOR HANGING UP PICTURES AND THE LIKE

BACKGROUND OF THE INVENTION

The instant invention relates generally to measuring tools and more specifically it relates to a measuring tool for hanging up a picture and the like.

Numerous measuring tools have been provided in the prior art that are adapted to scale off distances and mark level conditions on surfaces and includes various tape measures, squares and carpenters levels. While these units may be suitable for the particular purpose to which they address, they would not be as suitable for the purpose of the present invention as hereafter described.

SUMMARY OF THE INVENTION

A primary object of the present invention is to provide a measuring tool for hanging up a picture and the like that will overcome the shortcomings of the prior art devices.

Another object is to provide a measuring tool for hanging up a picture and the like that replaces a ruler and level when used to hang pictures, mirrors and shelving units on a wall.

An additional object is to provide a measuring tool for hanging up a picture and the like that combines the best features of a tape measure, a leveling device and a container for holding nails, which will speed up the task of hanging the picture and the like, level on a wall.

A further object is to provide a measuring tool for hanging up a picture and the like that is simple and easy to use.

A still further object is to provide a measuring tool for hanging up a picture and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWINGS FIGURES

The figures in the drawings are briefly described as follows.

DETAILED DESCRIPTION OF THE PREFERRED EMBODIMENTS

Figure 1:
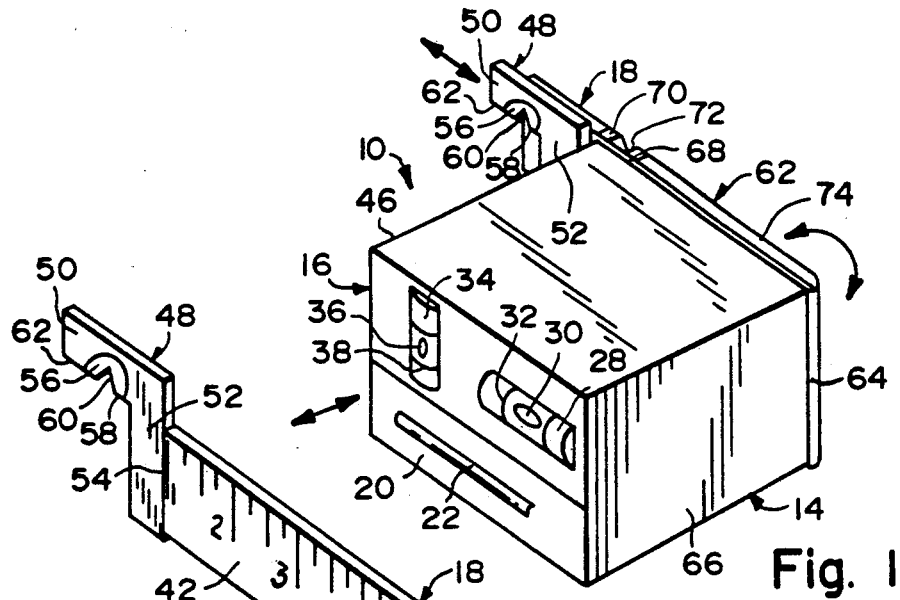
FIG. 1 is a perspective view of the instant invention in a closed position.
Figure 2:
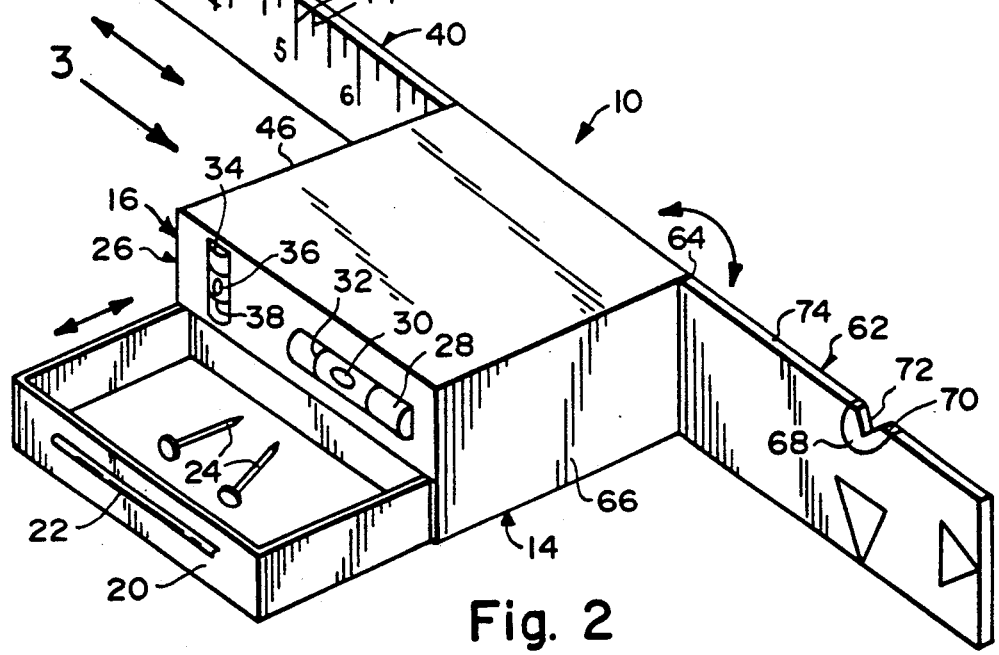
FIG. 2 is a perspective view similar to FIG. 1 in an open position.
Figure 3:
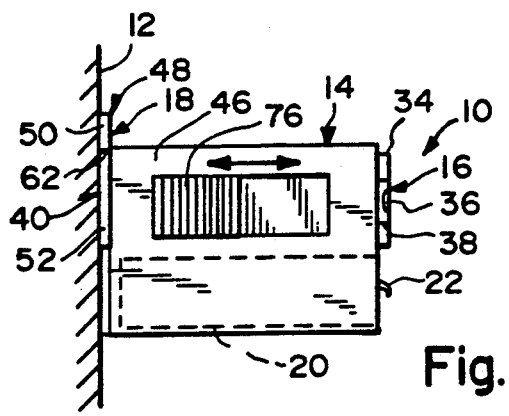
FIG. 3 is a side view taken in direction of arrow 3 in FIG. 2 shown placed against a vertical flat surface.

Turning now descriptively to the drawings, in which similar reference characters denote similar elements throughout the several views, the Figures illustrate a measuring tool 10 for hanging up a picture and the like onto a flat vertical surface 12. The measuring tool 10 consists of a box-shaped housing 14. A mechanism 16 is carried on the housing 14 for ascertaining whether the housing 14 is in a horizontal and vertical alignment with respect to the flat vertical surface 12. Another mechanism 18 is carried on the housing 14 for taking linear measurements between two points on the flat vertical surface. A drawer 20 having a pull handle 22 is disposed in the housing 14 for holding a plurality of nails 24, picture hooks, etcetera therein. When the drawer 20 is opened, two of the nails 24 can be removed and hammered into the two points measured on the flat vertical surface 12 allowing the picture and the like to be properly hung up on the flat vertical surface 12.

The alignment mechanism 16 includes a level instrument 26 built into the front of the housing 14 that includes a horizontal encased liquid filled tube 28 having an air bubble 30 that moves to a center window 32 when the level instrument 26 is set on a horizontal plane with respect to the flat vertical surface 12. A vertical encased liquid filled tube 34 has an air bubble 36 that moves to a center window 38 when the level instrument 26 is placed against a vertical plane with respect to the flat vertical surface 12.

The linear measurement mechanism 18 includes a tape measure 40 built into the housing 14 having an elongated tape 42 with scale markings 44 thereon, spring coiled within the housing 14 and extendable from a first side 46 thereof. An inverted L-shaped hook end 48 has a horizontal leg 50 and a vertical leg 52 affixed to the distal end 54 of the tape 42 of the tape measure 40. A first magnetic disc 56 having a flat 58 with a V-notch 60 is placed into the lower edge 62 of the horizontal leg 50 of the hook end 48 so that the flat 58 with the V-notch will hold a first ferrous nail 24 in position. An arm 62 is hinged at 64 to a corner of a second side 66 of the housing 14 opposite from the tape 42. A second magnetic disc 68 having a flat 70 with a V-notch 72 is placed into the upper edge 74 of the arm 62 so that the flat 70 with the V-notch 72 will hold a second ferrous nail 24 in position and be in alignment with the first nail 24, which are to be hammered into the flat vertical surface 12.

The measuring tool 10 further includes a switch 76 in the first side 46 of the housing 14 for the tape measure 40 to lock and automatically rewind the elongated tape 42 when needed as is well known in the tape measure art.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A measuring tool for hanging up a picture and the like onto a flat vertical surface, said measuring tool comprising:

a) a box-shaped housing;
   b) means carried on said housing for ascertaining whether said housing is in a horizontal and vertical alignment with respect to the flat vertical surface, wherein said alignment means includes a level instrument built into the front of said housing that includes:
      i) a housing encased liquid filled tube having an air bubble that moves to a center window when said level instrument is set on a horizontal plane with respect to the flat vertical surface; and
      ii) a vertical encased liquid filled tube having an air bubble that moves to a center window when said level instrument is set on a vertical plane with respect to the flat vertical surface;
c) means carried on said housing for taking linear measurements between two points on the flat vertical surface, wherein said linear measurement means includes:
  i) a tape measure built into said housing having an elongated tape with scale markings thereon, spring coiled within said housing and extendable from a first side thereof;
  ii) an inverted L-shaped hook end having a horizontal leg and a vertical leg affixed to the distal end of the tape of said tape measure;
  iii) a first magnetic disc having a flat with a notch placed into the lower edge of the horizontal leg of said hook end so that the flat with the V-notch will hold the first ferrous nail in position;
  iv) an arm hinged to a corner of a second side of said housing opposite from the tape; and
  v) a second magnetic disc having a flat with a V-notch placed into the upper edge of said arm so that the flat with the V-notch will hold the second ferrous nail in position and be in alignment with the first nail where by it may be hammered into the flat vertical surface; and
d) a drawer having a pull handle, disposed in said housing for holding a plurality of ferrous nails therein so that when said drawer is opened two of the nails can be removed and hammered into the two points measured on the flat vertical surface allowing the picture and the like to be properly hung up on the flat vertical surface.

2. A measuring tool as recited in claim 1, further including a switch in the first side of said housing to permit said tape measure to be locked or automatically rewound when required.

* * * * *